US008285592B2

(12) United States Patent
Tomchek et al.

(10) Patent No.: US 8,285,592 B2
(45) Date of Patent: Oct. 9, 2012

(54) METHODS AND SYSTEMS FOR PROVIDING ENHANCED DATA FOR CO-BRAND PAYMENT CARD TRANSACTIONS

(75) Inventors: Brad Michael Tomchek, St. Charles, MO (US); Robert Donald Reany, Wildwood, MO (US); Michael William Koch, Sandy Hook, CT (US); Edward Cletus Seaver, Sandy Hook, CT (US); Jonathan Robert Powell, Rye Brook, NY (US)

(73) Assignee: MasterCard International Incorporated, Purchase, NY (US)

( * ) Notice: Subject to any disclaimer, the term of this patent is extended or adjusted under 35 U.S.C. 154(b) by 310 days.

(21) Appl. No.: 12/638,775

(22) Filed: Dec. 15, 2009

(65) Prior Publication Data

US 2011/0145081 A1    Jun. 16, 2011

(51) Int. Cl.
*G06G 1/12* (2006.01)
(52) U.S. Cl. ............... 705/21; 705/39; 705/30; 705/44; 705/500; 235/380; 235/385
(58) Field of Classification Search .................... 705/21, 705/39, 30, 44; 235/380
See application file for complete search history.

(56) References Cited

U.S. PATENT DOCUMENTS

| 7,104,443 | B1 | 9/2006 | Paul et al. | |
|---|---|---|---|---|
| 7,406,442 | B1* | 7/2008 | Kottmeier et al. | 705/35 |
| 8,027,890 | B2* | 9/2011 | Kelly et al. | 705/30 |
| 8,055,557 | B2* | 11/2011 | Sorbe et al. | 705/30 |
| 2004/0249749 | A1* | 12/2004 | Strayer et al. | 705/39 |
| 2005/0234817 | A1* | 10/2005 | VanFleet et al. | 705/40 |
| 2005/0283435 | A1 | 12/2005 | Mobed et al. | |
| 2008/0005018 | A1 | 1/2008 | Powell | |
| 2008/0288396 | A1* | 11/2008 | Siggers et al. | 705/39 |
| 2009/0164370 | A1* | 6/2009 | Sorbe et al. | 705/40 |
| 2010/0100480 | A1* | 4/2010 | Altman et al. | 705/40 |

* cited by examiner

*Primary Examiner* — Vanel Frenel
(74) *Attorney, Agent, or Firm* — Armstrong Teasdale LLP

(57) ABSTRACT

A method and system for processing a financial transaction using an enhanced payment card through a multi-party payment card interchange network are provided. An authorization request message generated at a point of sale (POS) device associated with a merchant is received at a computer associated with the interchange network. The authorization request message includes a card identifier and relates to a transaction initiated by the cardholder with the merchant using the enhanced payment card. The transaction is electronically identified as involving the enhanced payment card by matching the received card identifier to a list of card identifiers stored within a database. A product code identifying the transaction as an enhanced payment card transaction is electronically added to the authorization request message. The merchant is instructed to transmit to the interchange computer an addendum file including enhanced transaction data for the enhanced payment card transaction.

29 Claims, 8 Drawing Sheets

METHODS AND SYSTEMS FOR PROVIDING ENHANCED DATA FOR CO-BRAND PAYMENT CARD TRANSACTIONS

BACKGROUND OF THE INVENTION

This invention relates generally to processing transactions associated with financial transaction card accounts and, more particularly, to network-based methods and systems for processing financial transactions using a co-brand payment card through a multi-party payment card interchange and communicating enhanced transaction data between a merchant and an issuer of the co-brand payment card.

At least some known merchants accept payment for goods and services using more than one type of financial transaction card systems. One type may be a multi-party transaction system where transactions are processed through a multi-party transaction system interchange. Another type may be a private label transaction system where merchants are directly communicatively coupled to a payment card issuer for transaction processing. Still another type may be a co-brand proprietary transaction system. For example, some merchants accept Visa®, MasterCard®, Discover®, and/or American Express® financial transaction cards. Some merchants also accept a private label financial transaction card, such as a Macy's®, Home Depot®, or other retail merchant card. Generally private label transaction systems are closed to transaction data being transmitted on the private label transaction systems that is not associated with a private label transaction. As such, less identification of the merchants and transaction information is required.

Most closed-loop, private label transaction systems are set up such that a merchant is able to communicate transaction data directly with the issuer of the private label card. Accordingly, in some known closed-loop, private label transaction systems, the merchant is able to communicate certain additional transaction data with the private label issuer as compared to a third-party interchange payment system. Of course, in order to communicate this additional transaction data, the computer systems and computer protocols used by the merchant and the private label issuer in the closed-loop system must be configured to exchange this additional data. Configuring these computer systems to communicate this additional data can be costly and time consuming.

Accordingly, it would be beneficial to be able to communicate enhanced transaction data between a merchant and a transaction card issuer over a known computer network such as an interchange network. Such a system would allow card issuers to provide special services and detailed information for transactions initiated by a cardholder using a co-brand proprietary transaction card at a participating merchant without having to incur the time and expense associated with providing a closed-loop, private label system.

BRIEF DESCRIPTION OF THE INVENTION

In one embodiment, a computer-based method for processing a financial transaction through an interchange network using an enhanced payment card is provided. The interchange network is associated with a computer coupled to a database. The enhanced payment card is issued to a cardholder by an issuer. The method includes storing within the database a list of card identifiers for identifying each enhanced payment card of a plurality of enhanced payment cards. An authorization request message generated at a point of sale (POS) device associated with a merchant is received at the computer. The authorization request message includes a card identifier and relates to a transaction initiated by the cardholder with the merchant using the enhanced payment card. The transaction is electronically identified as involving the enhanced payment card by matching the received card identifier to the list of card identifiers stored within the database. A product code identifying the transaction as an enhanced payment card transaction is electronically added to the authorization request message. The merchant is instructed to transmit to the computer an addendum file including enhanced transaction data for the enhanced payment card transaction.

In another embodiment, a network-based system for processing a financial transaction through a multi-party interchange network using an enhanced payment card is provided. The enhanced payment card is issued to a cardholder by an issuer. The system includes a point of sale (POS) device associated with a merchant and a database for storing data including a list of card identifiers for identifying each enhanced payment card of a plurality of enhanced payment cards. The system also includes a server system configured to be coupled to the POS device and the database. The server system is associated with the interchange network and configured to receive an authorization request message generated at the (POS) device. The authorization request message includes a card identifier and relates to a transaction initiated by the cardholder with the merchant using the enhanced payment card. The server system is also configured to electronically identify the transaction as involving the enhanced payment card by matching the received card identifier to the list of card identifiers stored within the database. The server system is further configured to electronically add a product code to the authorization request message identifying the transaction as an enhanced payment card transaction, and to instruct the merchant to transmit to the computer an addendum file including enhanced transaction data for the enhanced payment card transaction.

In another embodiment, a computer for processing a financial transaction initiated by a cardholder using an enhanced payment card is provided. The computer is associated with a multi-party interchange network, and the enhanced payment card is issued to the cardholder by an issuer. The computer is programmed to store data within a database including a list of card identifiers for identifying each enhanced payment card of a plurality of enhanced payment cards. The computer is also programmed to receive an authorization request message generated at a point of sale (POS) device. The authorization request message includes a card identifier and relates to the transaction initiated by the cardholder with a merchant using the enhanced payment card. The computer is further programmed to electronically identify the transaction as involving the enhanced payment card by matching the received card identifier to the list of card identifiers stored within the database. The computer is also programmed to electronically add a product code to the authorization request message identifying the transaction as an enhanced payment card transaction, and to instruct the merchant to transmit an addendum file including enhanced transaction data for the enhanced payment card transaction.

In another embodiment, a computer program embodied on a computer readable medium is provided for processing a financial transaction through an interchange network using an enhanced payment card. The enhanced payment card is issued to a cardholder by an issuer. The program is executed by a computer associated with the interchange network and instructs the computer to store within a database a list of card identifiers for identifying each enhanced payment card of a plurality of enhanced payment cards. The program also instructs the computer to receive an authorization request message generated at a point of sale (POS) device associated with a merchant. The authorization request message includes a card identifier and relates to a transaction initiated by the cardholder with the merchant using the enhanced payment card. The program further instructs the computer to identify the transaction as involving the enhanced payment card by matching the received card identifier to the list of card identifiers stored within the database. The program also instructs the computer to add a product code to the authorization request message identifying the transaction as an enhanced payment card transaction, and to instruct the POS device to transmit to the computer an addendum file including enhanced transaction data for the enhanced payment card transaction.

BRIEF DESCRIPTION OF THE DRAWINGS

FIG. 1 is a schematic diagram of an exemplary private label card account payment environment that includes a point of interaction controlled by a private label merchant, a card issuer or issuing bank, and a transaction processor interconnecting point of interaction and card issuer.

FIG. 2 is a schematic diagram illustrating an exemplary multi-party payment card industry system for enabling ordinary payment-by-card transactions in which merchants and card issuers do not necessarily have a one-to-one relationship.

FIG. 3 is a simplified block diagram of an exemplary system in accordance with one embodiment of the present invention.

FIG. 4 is an expanded block diagram of an exemplary embodiment of a server architecture of a system in accordance with one embodiment of the present invention.

FIG. 5 is a block diagram of an exemplary embodiment of a user computer device as shown in FIGS. 3 and 4.

FIG. 6 is a block diagram of an exemplary embodiment of a server computer device as shown in FIGS. 3 and 4.

FIG. 7 is a schematic block diagram showing a network configuration of the system shown in FIG. 3 in accordance with one embodiment of the present invention.

FIG. 8 is a flow diagram showing a method of processing a transaction initiated by a cardholder using an enhanced co-brand payment card at a merchant partner over an interchange network in accordance with an exemplary embodiment of the present invention.

DETAILED DESCRIPTION OF THE INVENTION

Figure 1:
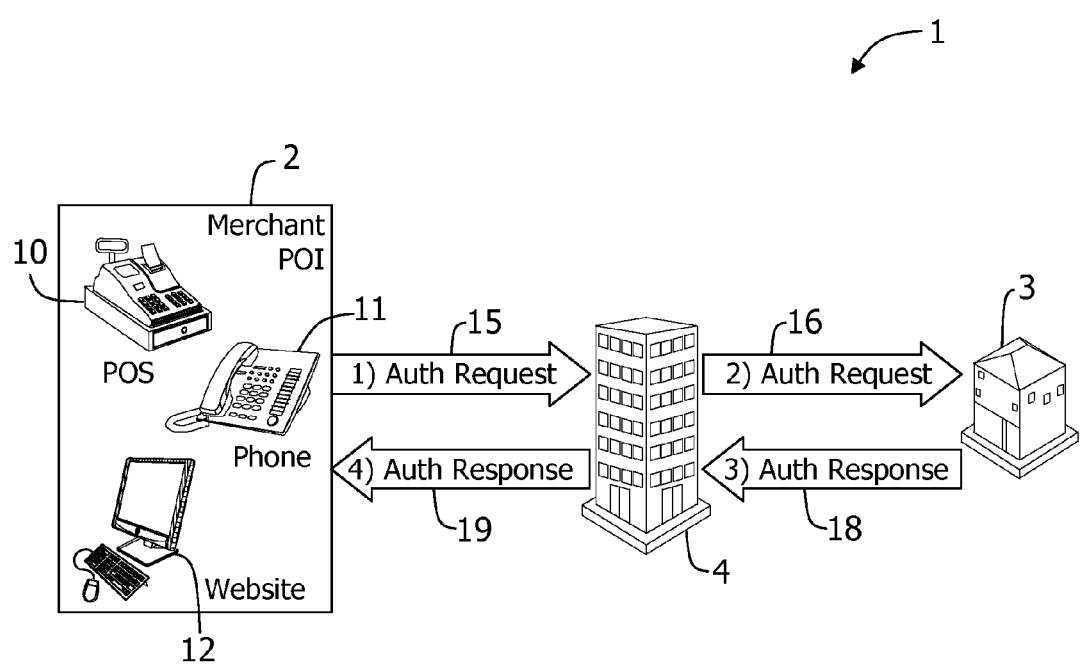
FIGS. 1-8 show exemplary embodiments of the methods and systems described herein.

Embodiments of the methods and systems described herein facilitate communication of enhanced transaction data between computer devices associated with a merchant and a payment card issuer over a third-party interchange network. A cardholder initiates a transaction with a merchant. The transaction may include purchasing products or services (collectively referred to herein as "goods") by a cardholder from a merchant at a point of sale (POS) device or online via a computer system (collectively referred to as "POS device" or "merchant device"). The cardholder initiates the transaction using an enhanced payment card described herein, which is also referred to as an enhanced transaction card. In the embodiments described herein, the enhanced payment card is an enhanced co-brand payment card, but it could be any payment card associated with the exchange of such enhanced transaction data. The payment card is associated with a product code indicating the type of payment card and/or indicating how transactions involving the payment card are to be processed.

After the cardholder initiates the transaction with the enhanced payment card, an authorization request message is transmitted from the merchant to the payment card issuer over the third party interchange network. When received at the interchange network, the transaction is identified as involving an enhanced payment card and a product code is added to the authorization request message. The product code identifies the transaction as being an enhanced payment card transaction. Once the transaction is authorized by the payment card issuer, an authorization response message with the product code is transmitted to the merchant over the third party interchange network. The authorization response message authorizes the merchant to complete the transaction with the cardholder, and the product code instructs the merchant to create an addendum file that includes certain enhanced transaction data. The merchant then transmits a clearing message with the addendum file to the issuer through the interchange network. The clearing message further completes the transaction. By providing the issuer with the enhanced transaction data stored within the addendum file, the issuer is able to provide additional services to the cardholder and/or the merchant including providing promotional offers, special financing offers, and/or additional billing information.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, a co-brand proprietary transaction card (also referred to as a co-brand card or co-brand transaction card or a co-brand payment card) is a payment card that can be used at a co-brand partner's location (e.g., a point of sale of a participating merchant) wherein the transaction is then processed by a third-party interchange network. The co-brand card can also be used by the cardholder at a non co-brand partner's location when that non co-brand partner is registered with the third-party interchange network. Co-branded cards are oftentimes designed with the participating merchant's company brand as the dominant brand represented on the face of the card but may also contain the logo of the third-party interchange network (e.g., MasterCard®) and the name of the issuing bank. Co-branding is a partnership between the interchange network, the participating merchant, and a card issuer that can result in increased card usage, higher spending levels, efficient marketing opportunities, and higher satisfaction and value for customers. In one embodiment described herein, the co-brand payment card is associated with a single co-brand merchant partner. The single co-brand merchant partner may be a single business entity having multiple points of sale or multiple locations. The co-brand payment card is then configured to allow the cardholder to initiate private label transactions at any of the points of sale of the single co-brand merchant partner or initiate non-private label transactions with merchants other than the single co-brand merchant partner that are registered with the interchange network. In another embodiment described herein, the co-brand payment card is associated with a coalition of co-brand merchant partners. The coalition of co-brand merchant partners includes a plurality of merchant partners wherein each merchant partner is a separate business entity. Each of these separate merchant partners may have multiple point of sale or multiple locations. The co-brand payment card is then configured to allow the cardholder to initiate private label transactions at any of the coalition merchant partners or initiate non-private label transactions with merchants other than the coalition merchant partners that are registered with the interchange network.

The methods and systems described herein enable merchants, such as merchants participating in a co-brand program, to communicate enhanced transaction data to an issuer over an interchange network when a cardholder uses a transaction card to initiate a transaction with a merchant. The enhanced transaction data is communicated over a known interchange network using an addendum data file configured to be communicated from the merchant through the third-party interchange network to the issuer. The enhanced transaction data includes, but is not limited to: identifying characteristics of the product or services purchased by the cardholder from the merchant (collectively referred to herein as the "goods"), financing terms associated with the goods and/or the transaction, a size of the goods, a per unit price of the goods, an identifying characteristic of the goods, a promotion code, line item stock-keeping unit (SKU) data, and/or other information relating to the goods and/or the transaction. For example, in the case of providing financing data for an enhanced transaction, the enhanced transaction data may include information such as deferring the accrual of interest for six months on the transaction; or in the case of providing other information, the enhanced transaction data may include mileage on a automobile or a difference in mileage from a previous purchase if the transaction relates to goods relating to automobile service (e.g., oil change or fuel purchase).

The methods and systems described herein may be implemented using computer programming or engineering techniques including computer software, firmware, hardware or any combination or subset thereof, wherein one of the technical effects is to facilitate communication of enhanced transaction data between computer devices associated with a merchant and a payment card issuer over a third-party interchange network. The transaction is typically initiated by a cardholder, who purchases goods from the merchant at a point of sale (POS) terminal. The cardholder initiates the transaction using an enhanced payment card or an enhanced transaction card such as an enhanced co-brand payment card.

The at least one technical effect is achieved by one or more of: (a) providing a co-brand payment card to a cardholder, wherein the payment card is issued by an issuer to a cardholder and is associated with a co-brand program, and wherein the co-brand program includes the issuer, a co-brand merchant partner and a third-party interchange network; (b) designating the payment card as an enhanced payment card; (c) storing in a database at the interchange network a card identifier such as an account number associated with the payment card for identifying the payment card as the enhanced payment card; (d) initiating a transaction by the cardholder at a point of sale device associated with the merchant partner using the enhanced payment card; (e) transmitting an authorization request message from the merchant device to the interchange network wherein the authorization request message includes the card identifier; (f) identifying, at the interchange network, the transaction as involving the enhanced payment card by comparing the card identifier included within the authorization request message to data stored within the database; (g) adding a product code to the authorization request message identifying the transaction as an enhanced payment card transaction; (h) transmitting the authorization request message with the product code to the issuer; (i) transmitting an authorization response message from the issuer to the interchange network, the authorization response message including an approved or declined response, and the product code; (j) transmitting the authorization response message to the merchant, wherein the product code instructs the merchant partner to create an addendum file including enhanced transaction data; (k) transmitting clearance data with the addendum file from the merchant to the interchange network; (l) transmitting the clearance data with the addendum file from the interchange network to the issuer; and (m) utilizing the enhanced transaction data including prompting the issuer to apply certain promotional programs to the transaction, prompting the issuer to apply certain financing programs to the transaction, promoting the issuer to offer new promotional programs or financing programs to the cardholder, and providing additional detailed billing information to the cardholder in the cardholder's billing statement.

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed-loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
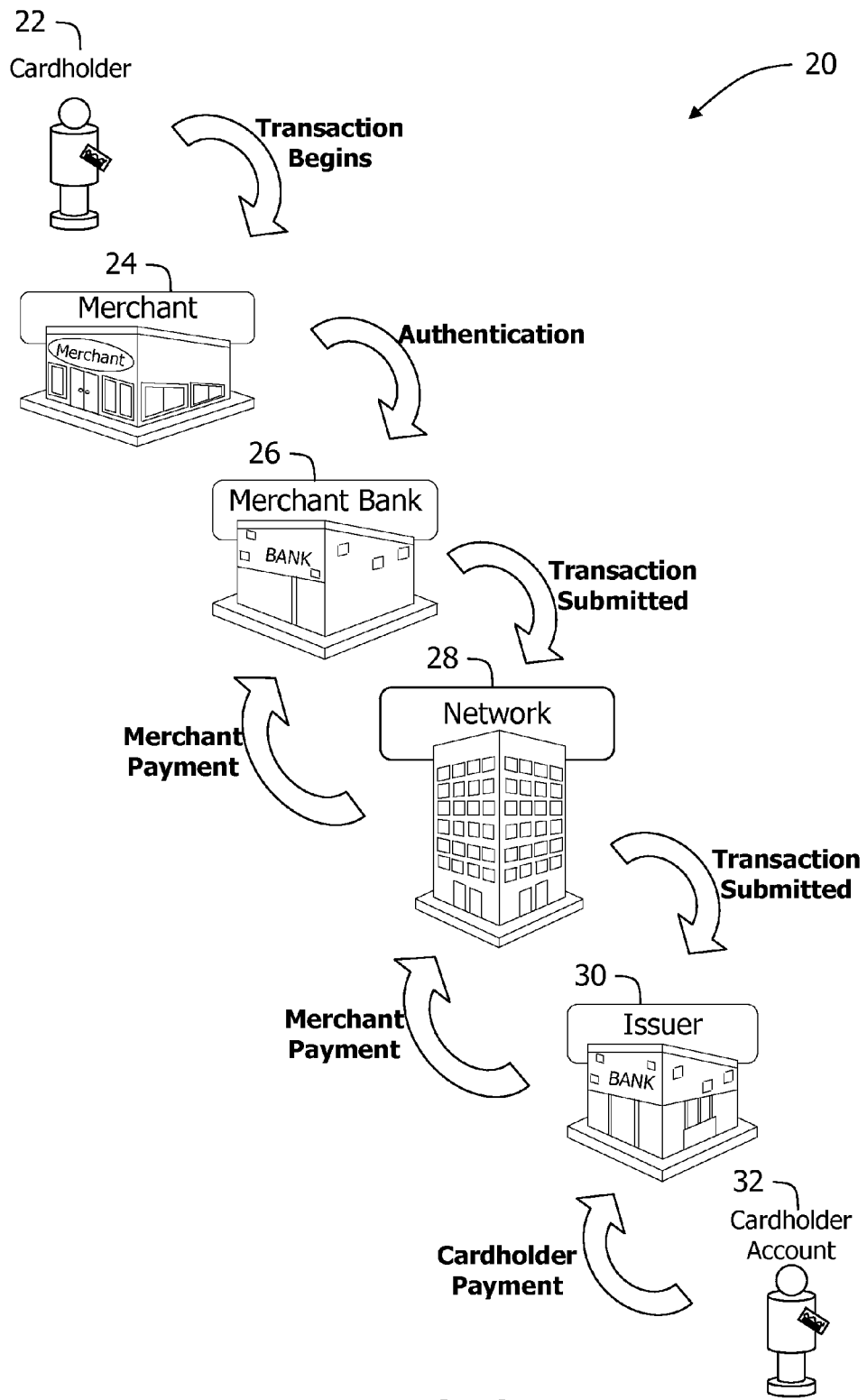

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
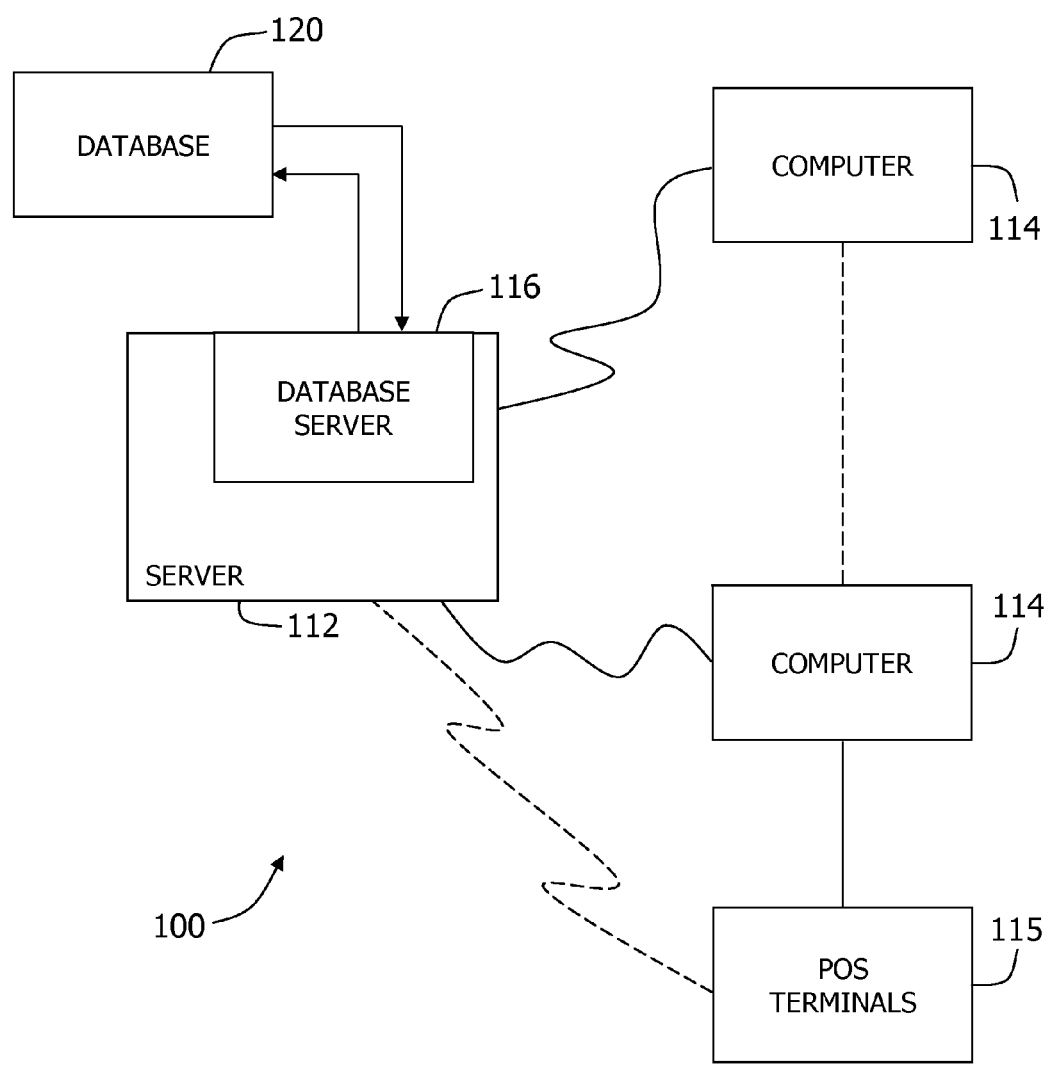

FIG. 3 is a simplified block diagram of an exemplary system 100 in accordance with one embodiment of the present invention. System 100 is a payment card system, which can be utilized by account holders as part of a process of initiating an authorization request and transaction as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store enhanced transaction data including, but not limited to: identifying characteristics of the goods purchased by the cardholder from the merchant, financing terms for the goods, a size of the goods, a per unit price of the goods, and other information relating to the goods. Database 120 may also store other data including a list of merchants and corresponding merchant identifiers of merchants participating in co-brand programs with the interchange network, and a list of product codes.

In the example embodiment, one of client systems 114 may be associated with an acquirer while another one of client systems 114 may be associated with an issuer, POS terminal 115 may be associated with a co-brand merchant partner, and server system 112 may be associated with the interchange network.

Figure 4:
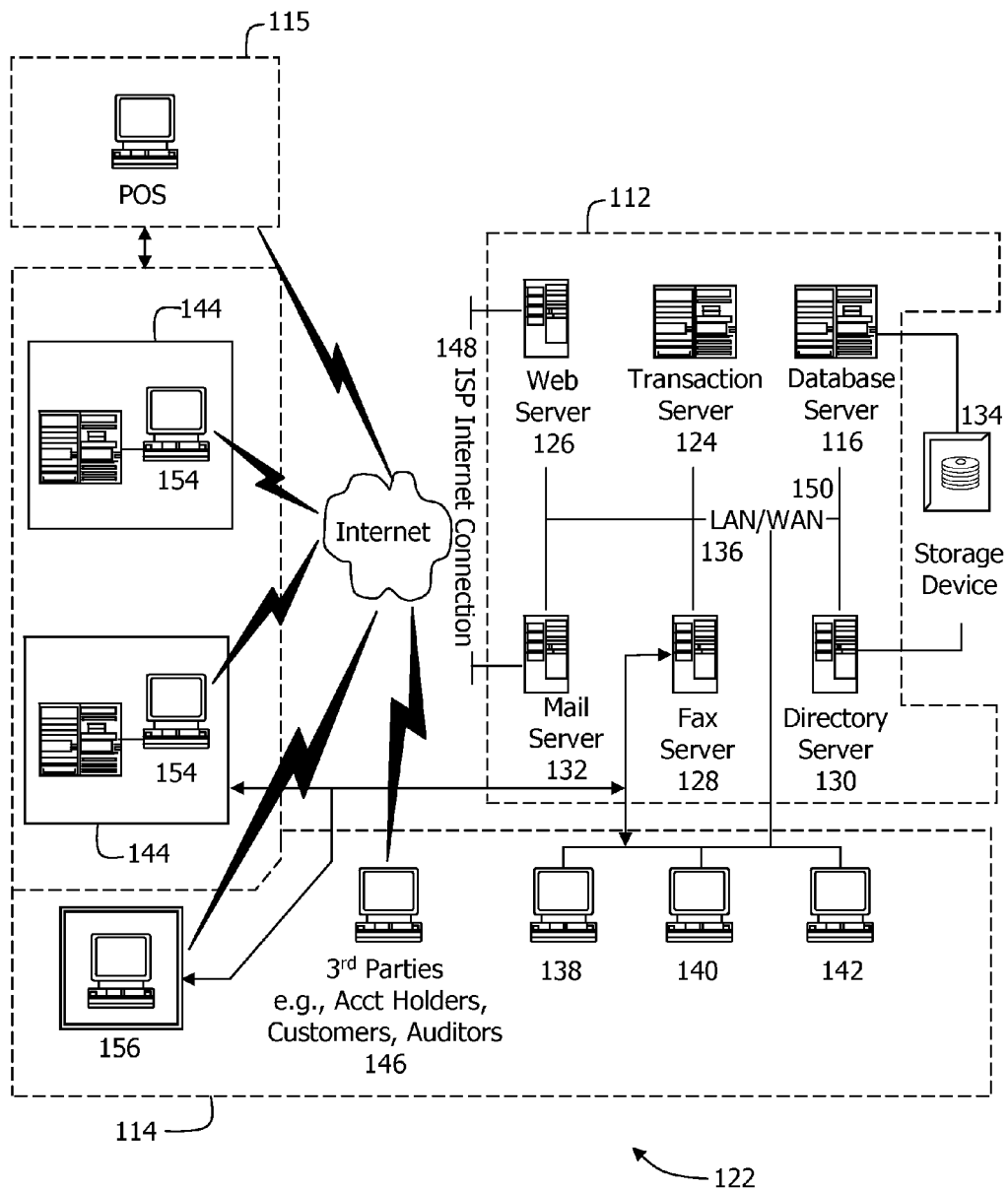

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112, client systems 114, and POS terminals 115. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 5:
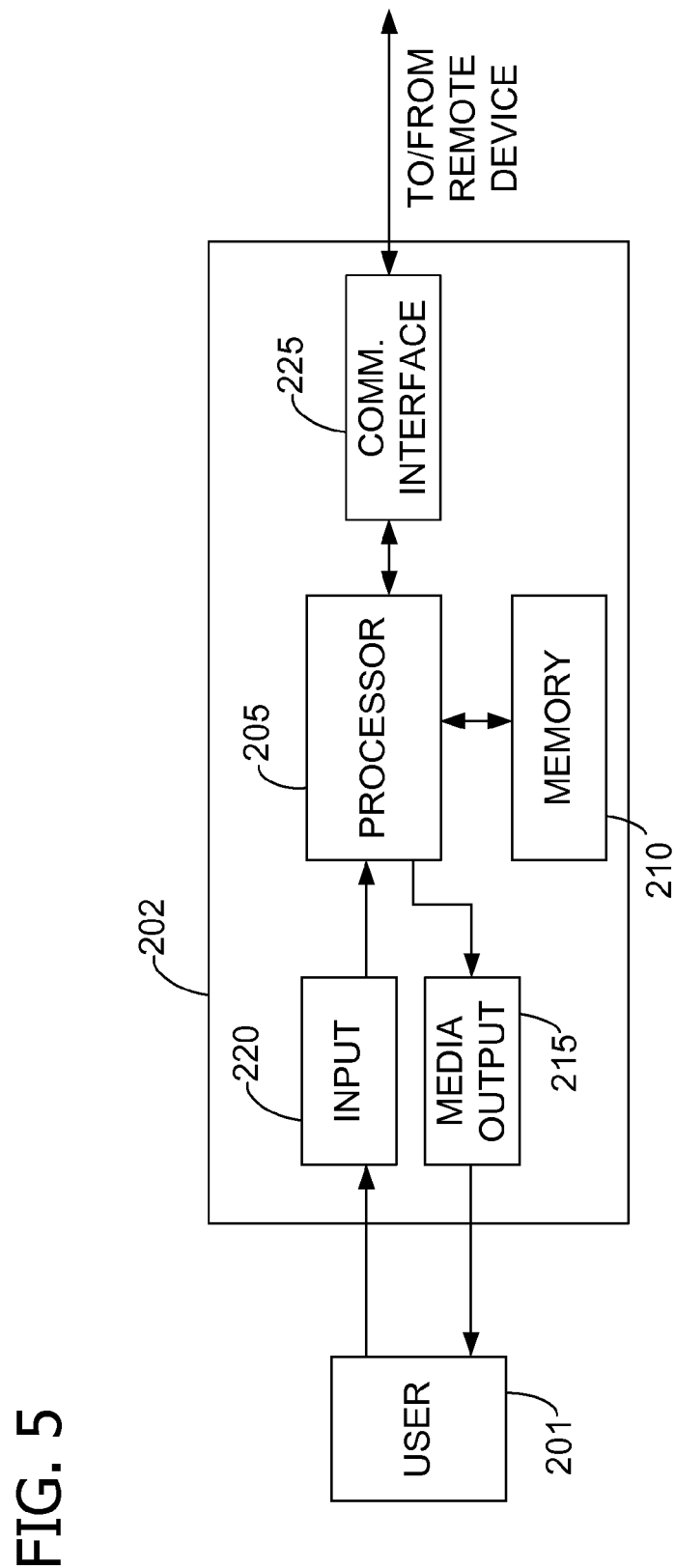

FIG. 5 illustrates an exemplary configuration of a user computer device 202 operated by a user 201. User computer device 202 may include, but is not limited to, client systems 114, 138, 140, and 142, POS terminal 115, workstation 154, and manager workstation 156.

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 6:
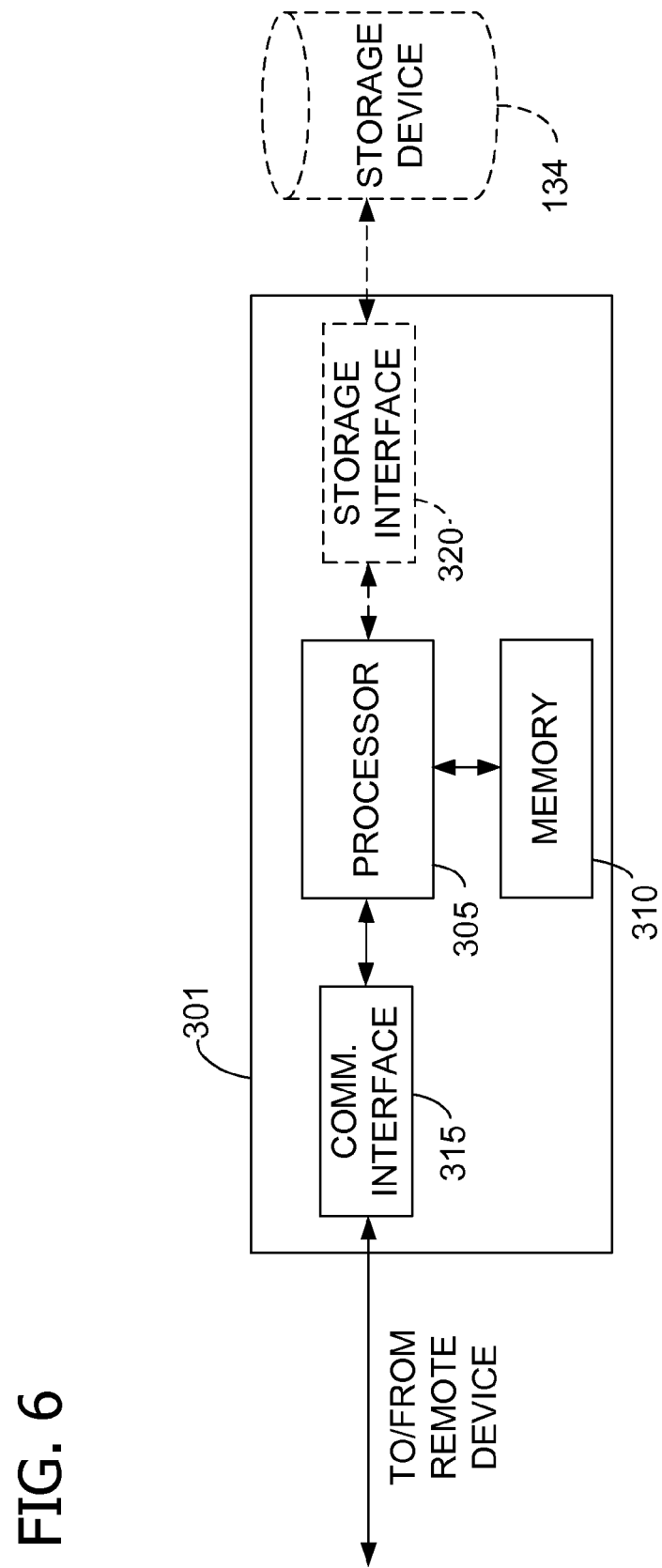

FIG. 6 illustrates an exemplary configuration of a server computer device 301 such as server system 112 (shown in FIG. 2). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 via the Internet, as illustrated in FIG. 3.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
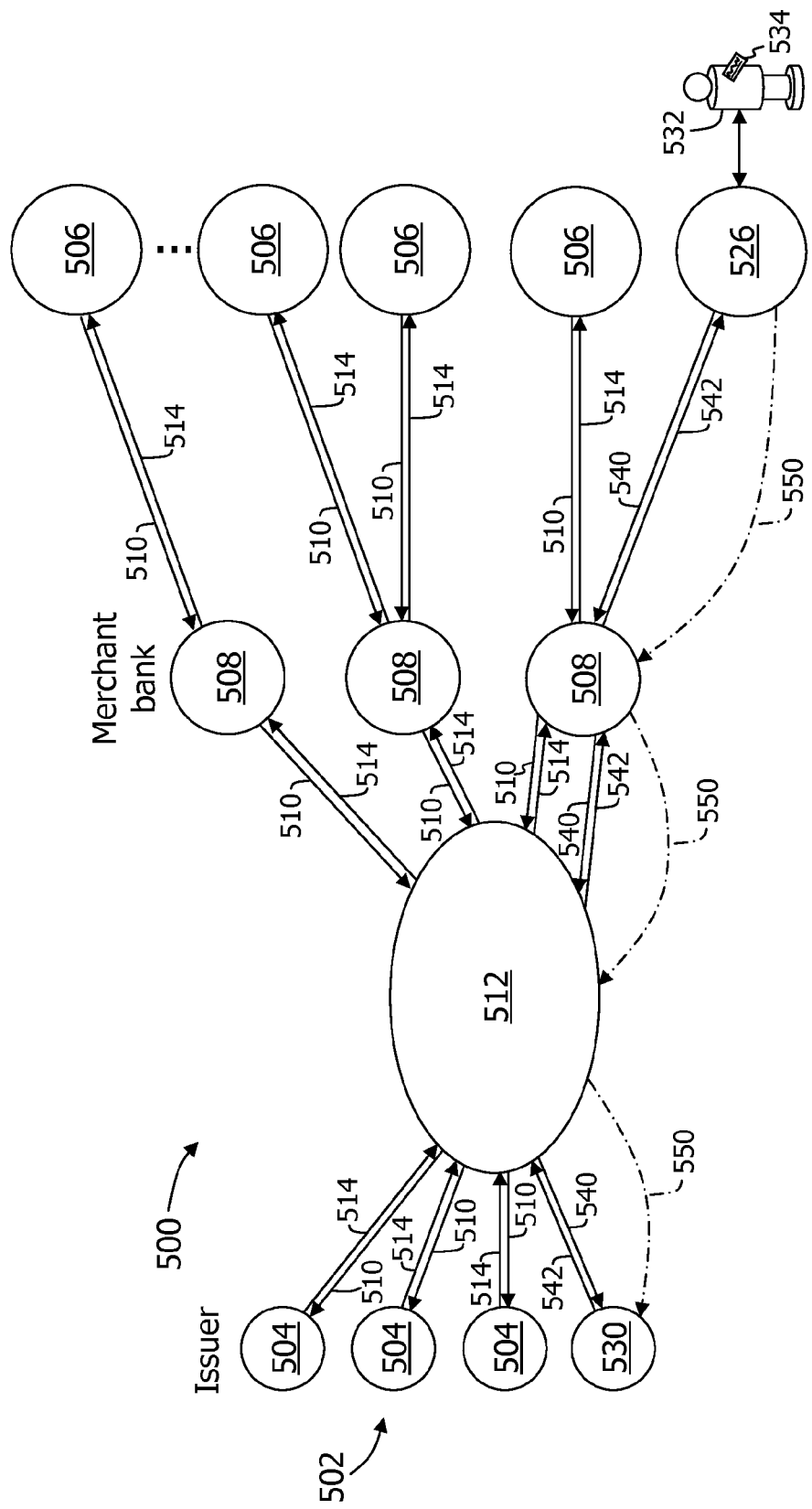

FIG. 7 is a schematic block diagram of a network configuration 500 in accordance with one embodiment of the present invention. Network configuration 500 is a more detailed description of system 100 (shown in FIG. 3) showing the different parties that are involved in processing a transaction involving a cardholder, a merchant, an interchange network, and a payment card issuer.

In network configuration 500, a multi-party payment card system 502 includes one or more issuer financial institutions 504 that issue a payment card, such as a credit card, to a consumer, who uses the payment card to tender payment for a purchase from a plurality of merchants 506. As discussed below, at least one of the payment cards is an enhanced co-brand payment card. Operations described below may be performed by a user computer device 202 (shown in FIG. 5) and/or a server computer device 301 (shown in FIG. 6). For example, issuer bank 504, payment network 512, merchant bank 508, and/or merchant 506 may operate a server computer device 301. In addition, or alternatively, cardholder 532 and/or merchant 506 may operate a user computer device 202.

A merchant bank 508 permits merchant 506 to accept payment with the payment card though an account established with merchant bank 508. Merchant bank 508 is normally a financial institution that is part of payment card system 502. When a consumer tenders payment for a purchase with a payment card (also known as a financial transaction card), merchant 506 transmits an authorization request 510 to merchant bank 508 for the amount of the purchase.

Merchant bank 508 communicates with issuer bank 504 through an interchange network 512 to determine whether the consumer's account is in good standing and whether the purchase is covered by the consumer's available credit line. Based on these determinations, issuer bank 504 declines or accepts authorization request 510. If the request is accepted, an issuer bank 504 issues an authorization code to merchant 506 and transmits an authorization response 514 to merchant 506, via interchange network 512 and merchant bank 508, to complete the transaction.

At least some merchants 526 also accept co-brand payment cards that are processed through an associated merchant bank 508. Co-brand merchants 526 are merchants that have entered into a co-brand program (also referred to as merchant partners) with an issuer 530 and with interchange network 512. Co-brand merchants 526 may have one or more points of sale. In the case where a cardholder 532 uses an enhanced co-brand payment card 534 to initiate a transaction with merchant 526 for the purchasing of goods, merchant 526 transmits an authorization request 540 to merchant bank 508 to be processed by interchange network 512. Interchange network 512 forwards authorization request 540 to issuer 530, and issuer 530 transmits an authorization response 542 to merchant 526 via interchange network 512 and merchant bank 508.

More specifically, when cardholder 532 uses an enhanced co-brand payment card to initiate a transaction with merchant 526, interchange network 512 receives authorization request 540 from merchant bank 508. Interchange network 512 identifies the transaction as involving enhanced payment card 534 by comparing a card identifier included within authorization request 540 to data stored within a database associated with interchange network 512, such as database 120 provided by database server 116. In one embodiment, interchange network 512 retrieves a product code from database 120 based on a bin number included in authorization request 540.

After identifying the transaction as an enhanced payment card transaction, interchange network 512 adds a product code to authorization request 540 which identifies the transaction as an enhanced payment card transaction. Interchange network 512 then transmits authorization request 540 with the product code to issuer 530. Issuer 530 determines whether to approve or decline the transaction, and transmits authorization response 542 to interchange network 512. Authorization response 542 includes an approved or declined response and the product code. Interchange network 512 forwards authorization response 542 to merchant 526.

In the exemplary embodiment, merchant 526 receives authorization response 542 including an approved response. Based on the approved response and the product code, merchant 526 creates an addendum file which includes enhanced transaction data. When clearing transactions including the enhanced payment card transaction, merchant 526 transmits to merchant bank 508 a clearing message 550 with the addendum file. Merchant bank 508, in turn, transmits clearing message 550 to interchange network 512.

Interchange network 512 receives clearing message 550 and transmits clearing message 550 to issuer 530. Clearing message 550 may be a single transmission including conventional clearing data and the addendum file. Alternatively, clearing message 550 may include a plurality of transmissions, such as a first transmission including conventional clearing data and a second transmission including enhanced transaction data.

Transmitting the enhanced data to issuer 530 facilitates providing additional services and/or reporting details to cardholder 532 and/or merchant 526. In some embodiments, based on enhanced transaction data corresponding to a transaction, issuer 530 applies a promotional program to the transaction, applies a financing program to the transaction, offers a new promotional program or financing program to cardholder 532, and/or provides additional detailed billing information to cardholder 532 in a billing statement.

Figure 8:
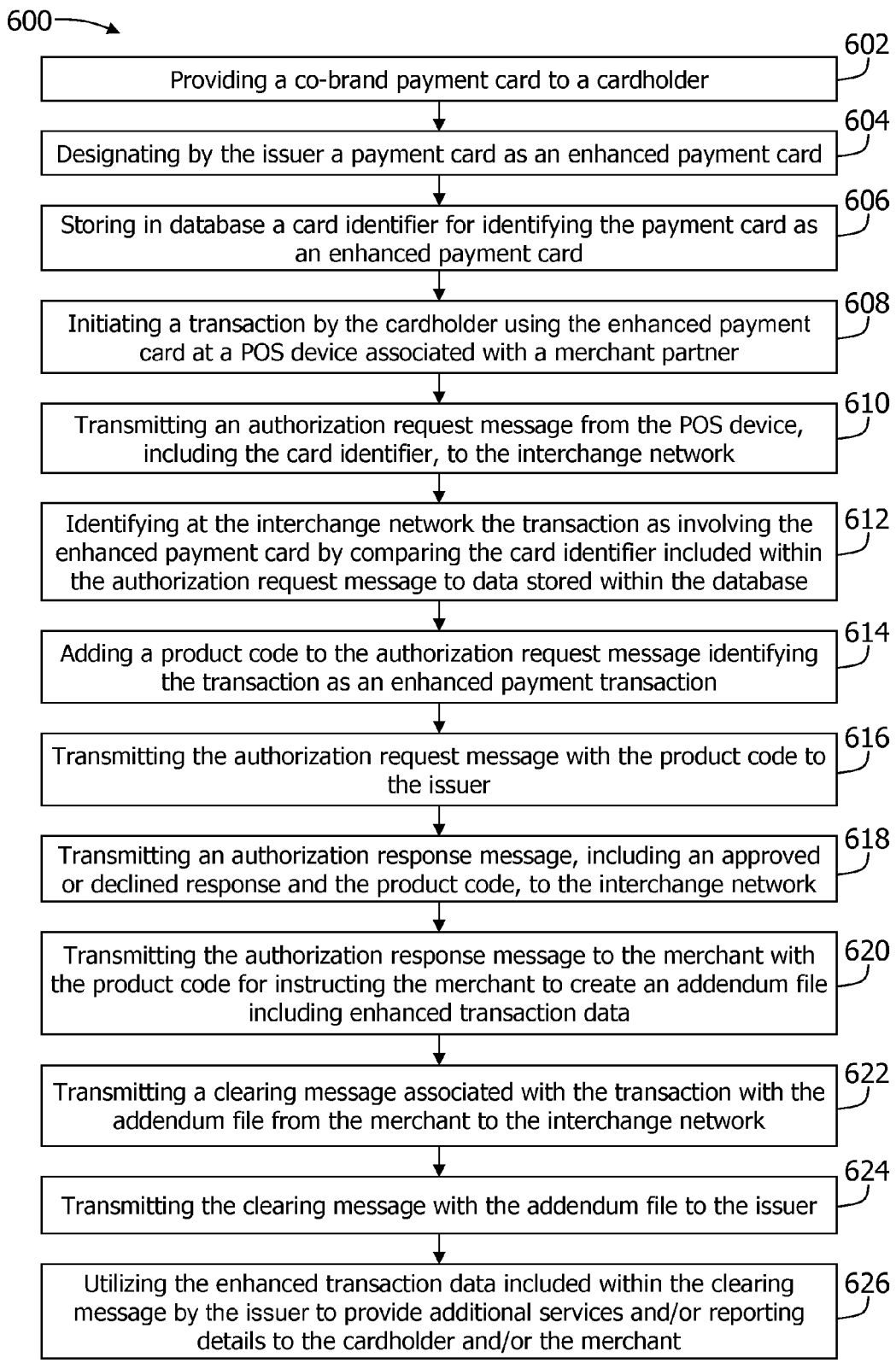

FIG. 8 is a flow diagram showing a method 600 of processing a transaction initiated by a cardholder using an enhanced co-brand payment card at a merchant partner over an interchange network in accordance with an exemplary embodiment of the present invention. In the example embodiment, system 100 (shown in FIG. 3) as shown in network configuration 500 (shown in FIG. 7) processes a financial transaction initiated by cardholder 532 using an enhanced co-brand payment card 534 over a multi-party payment card interchange network 512. In the example embodiment, interchange network 512 includes server system 112, which is coupled to database 120. Merchants 506 and 526 are associated with POS terminals 115, while merchant banks 508 and issuers 504 and 530 are associated with client systems 114.

Method 600 includes providing 602 a co-brand payment card to a cardholder. The payment card is issued by an issuer to a cardholder and is associated with a co-brand program. The co-brand program is a partnership involving an issuer of the co-brand payment card, a co-brand merchant partner having one or more points of sale, and the interchange network. In the case where the payment card is enhanced co-brand payment card 534, issuer 530 designates 604 the payment card as enhanced payment card 534, and stores 606 in database 120 at interchange network 512 a card identifier such as an account number associated with the payment card for identifying the payment card as enhanced payment card 534.

Cardholder 532 initiates 608 a transaction at POS device 115 associated with merchant partner 526 using enhanced payment card 534. POS device 115 transmits 610 authorization request message 540, including the card identifier, from POS device 115 to interchange network 512. Interchange network 512 identifies 612 the transaction as involving enhanced payment card 534 by comparing the card identifier included within authorization request message 540 to data stored within database 120. Further, in one embodiment, a list of merchant partners 526 associated with the co-brand program is stored within database 120. At the computer, whether the transaction originated at one of co-brand merchant partners 526 is determined by comparing data included within authorization request message 540 to the list of merchant partners stored within database 120.

Interchange network 512 then adds 614 a product code to authorization request message 540 which identifies the transaction as an enhanced payment card transaction, and transmits 616 authorization request message 540 with the product code to issuer 530. In one embodiment, the product code is added 614 to authorization request message 540 by populating a data field included within authorization request message 540 with the product code, and the product code represents that the transaction was initiated with one of the enhanced payment cards, such as enhance payment card 534. Issuer 530 then determines whether to approve or decline the transaction, and transmits 618 authorization response message 542 to interchange network 512. Authorization response message 542 includes an approved or declined response and the product code. In one embodiment, an approved response represents that the cardholder has sufficient funds to settle the transaction, and a declined response represents that the cardholder does not have sufficient funds to settle the transaction.

Interchange network 512 receives authorization response message 542 and then transmits 620 authorization response message 542 to merchant 526, wherein the product code included within authorization response message 542 instructs merchant 526 to create an addendum file including enhanced transaction data. Merchant 526 transmits 622 clearing message 550 associated with the transaction with the addendum file to interchange network 512. Interchange network 512 receives clearing message 550 and then transmits 624 clearing message 550 with the addendum file to issuer 530. Issuer 530 utilizes 626 the enhanced transaction data included within clearing message 550 to provide additional services and/or reporting details to cardholder 532 and/or merchant 526 such as applying certain promotional programs to the transaction, applying certain financing programs to the transaction, offering new promotional programs or financing programs to the cardholder, and providing additional detailed billing information to the cardholder in the cardholder's billing statement.

For example, the enhanced transaction data may include a promotion code such as DE48, subelement 95. The promotion code may be used by the co-brand merchant to transmit to the acquirer, and in turn to the interchange network and the issuer, discounts to be applied to the goods involved in the transaction at the point of sale device of the co-brand merchant. The discounts may include a reduction in price of the goods, or promotions whereby interest will not accrue, or accrue at a reduced rated, on the funds used to purchase the goods for a set period of time.

In addition, a variety of other types of information describing the goods may be included in the enhanced transaction data without departing from the scope of the embodiments of the present invention, and the examples provided herein should not be construed as limiting the scope thereof. For example, when the goods involved in the transaction include motor vehicle fuel, the enhanced transaction data may include data describing the motor vehicle fuel, the quantity of the fuel purchased, and the per unit price thereof. The data may also include the grade or specific type of fuel purchased in the transaction (e.g., 87 octane unleaded gasoline), and the mileage associated with the vehicle. In another example, the goods include an article of clothing, and the enhanced transaction data includes data describing the article of clothing, such as, but not limited to, the type of clothing (e.g., trousers, socks, or shirts), the size, the color, and/or the quantity of the article of clothing purchased. Moreover, in this example the enhanced transaction data may include financing terms (similar or the same as the promotion code described above) for any of the articles of clothing (i.e., the enhanced transaction data may indicate that interest will not accrue on the purchase of the article until six months thereafter).

The enhanced transaction data provided to the issuer can be utilized by the issuer for a variety of purposes, such as providing more detailed account statements to the cardholder, providing rewards to the cardholder based on the transaction, or marketing additional goods or services to the cardholder based on the data describing the goods involved in the transaction. In the motor fuel example described above, the issuer may provide the quantity and type of fuel purchased by the cardholder in a monthly statement to the cardholder. Moreover, the issuer may provide rewards based on the quantity of fuel purchased by the cardholder (e.g., a $5.00 credit for every 50 gallons of gasoline purchased). In the clothing example, the issuer may provide a detailed accounting of the clothing purchased by the cardholder in a monthly statement to the cardholder. In addition, the issuer may provide rewards or market other products to the cardholder based on the quantity or types of clothing the cardholder has purchased (e.g., the issuer may offer a discount or coupon applicable towards a pair of dress shoes to a cardholder who has recently purchased a suit).

Based on the foregoing specification, the above-discussed embodiments of the invention may be implemented using computer programming or engineering techniques including computer software, firmware, hardware or any combination or subset thereof, wherein the technical effect is to facilitate communication of enhanced transaction data between computer devices associated with a merchant and a payment card issuer over a third-party interchange network. Any such resulting program, having computer-readable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The above-described embodiments of a method and system of processing transactions associated with financial transaction card accounts and, more particularly, to network-based methods and systems for processing financial transactions using an enhanced co-brand proprietary financial transaction card through a multi-party payment card interchange. More specifically, additional data describing the subject of the transaction is provided for transactions originating at a point of sale device associated with the co-brand merchant partner to an issuer of the co-brand proprietary financial transaction card. The transaction is processed through a traditional third-party interchange network in a cost-effective and reliable manner. Moreover, the co-brand card is capable of originating transactions at points of sale not associated with the co-brand merchant partner, thus resulting in increased efficiency and value for the cardholder.

While the disclosure has been described in terms of various specific embodiments, it will be recognized that the disclosure can be practiced with modification within the spirit and scope of the claims.

What is claimed is:

1. A computer-based method for processing a financial transaction through an interchange network using an enhanced payment card, the interchange network associated with a computer coupled to a database, the enhanced payment card issued to a cardholder by an issuer, said method comprising:
    storing within the database a list of card identifiers for identifying each enhanced payment card of a plurality of enhanced payment cards;
    receiving, at the computer, an authorization request message generated at a point of sale (POS) device associated with a merchant, the authorization request message including a card identifier and relating to a transaction initiated by the cardholder with the merchant using the enhanced payment card;
    electronically identifying the transaction as involving the enhanced payment card by matching the received card identifier to the list of card identifiers stored within the database;
    electronically adding a product code to the authorization request message identifying the transaction as an enhanced payment card transaction; and
    instructing the merchant to transmit to the computer an addendum file including enhanced transaction data for the enhanced payment card transaction.

2. A computer-based method according to claim 1 wherein electronically adding a product code to the authorization request message further comprises:
    transmitting the authorization request message with the product code to the issuer;
    receiving, at the computer, an authorization response message from the issuer, the authorization response message including an approved or declined response, and the product code; and
    transmitting the authorization response message to the merchant, wherein the product code instructs the merchant to create the addendum file.

3. A computer-based method according to claim 2 wherein receiving, at the computer, an authorization response message from the issuer further comprises receiving the authorization response message from the issuer including the approved or declined response, wherein the approved response represents that the cardholder has sufficient funds to settle the transaction and the declined response represents that the cardholder does not have sufficient funds to settle the transaction.

4. A computer-based method according to claim 1 further comprising:
    receiving, at the computer, a clearing message including the addendum file from the merchant; and
    transmitting the clearing message with the addendum file to the issuer, the addendum file including the enhanced transaction data for instructing the issuer to at least one of apply a promotional program to the transaction, apply a financing program to the transaction, offer a new promotional program to the cardholder, and offer a new financing program to the cardholder.

5. A computer-based method according to claim 1 further comprising:
    receiving, at the computer, a clearing message including the addendum file from the merchant; and
    transmitting the clearing message with the addendum file to the issuer, the issuer providing at least a portion of the enhanced transaction data to the cardholder in a billing statement.

6. A computer-based method according to claim 5 wherein transmitting the clearing message further comprises transmitting the addendum file with the enhanced transaction data to the issuer, wherein the enhanced transaction data includes at least one of data describing goods involved in the transaction, an identifying characteristic of the goods, financing terms associated with the transaction, a size of the goods, a promotion code, line item stock-keeping unit (SKU) data, and a per unit price of the goods.

7. A computer-based method according to claim 1 wherein the enhanced payment card is an enhanced co-brand payment card, the enhanced co-brand payment card is associated with a cardholder and a co-brand program, the co-brand program including an issuer, a co-brand merchant partner having one or more points of sale, and the interchange network.

8. A computer-based method according to claim 7 wherein receiving, at the computer, an authorization request message generated at a point of sale (POS) device further comprises:
    storing within the database a list of merchant partners associated with the co-brand program; and
    determining, at the computer, whether the transaction originated at one of the co-brand merchant partners by comparing data included within the authorization request to the list of merchant partners stored within the database.

9. A computer-based method according to claim 1 wherein electronically adding a product code to the authorization request message further comprises:
    populating a data field included within the authorization request message with the product code, the product code representing that the transaction was initiated with one of the enhanced payment cards.

10. A network-based system for processing a financial transaction through a multi-party interchange network using an enhanced payment card, the enhanced payment card issued to a cardholder by an issuer, said system comprising:
    a point of sale (POS) device associated with a merchant;
    a database for storing data including a list of card identifiers for identifying each enhanced payment card of a plurality of enhanced payment cards; and
    a server system configured to be coupled to the POS device and the database, said server system associated with the interchange network, said server system configured to:
    receive an authorization request message generated at the (POS) device, the authorization request message including a card identifier and relating to a transaction initiated by the cardholder with the merchant using the enhanced payment card;

electronically identify the transaction as involving the enhanced payment card by matching the received card identifier to the list of card identifiers stored within the database;

electronically add a product code to the authorization request message identifying the transaction as an enhanced payment card transaction; and instruct the merchant to transmit to the computer an addendum file including enhanced transaction data for the enhanced payment card transaction.

11. A system according to claim 10 wherein said server system is further configured to:

transmit the authorization request message with the product code to an issuer device;

receive an authorization response message from the issuer device, the authorization response message including an approved or declined response, and the product code; and transmit the authorization response message to the POS device, wherein the product code instructs the merchant to create the addendum file.

12. A system according to claim 11 wherein said server system is further configured to:

receive the authorization response message from the issuer device including the approved or declined response, wherein the approved response represents that the cardholder has sufficient funds to settle the transaction and the declined response represents that the cardholder does not have sufficient funds to settle the transaction.

13. A system according to claim 10 wherein said server system is further configured to:

receive a clearing message including the addendum file from the POS device; and transmit the clearing message with the addendum file to an issuer device, the addendum file including the enhanced transaction data for instructing the issuer to at least one of apply a promotional program to the transaction, apply a financing program to the transaction, offer a new promotional program to the cardholder, and offer a new financing program to the cardholder.

14. A system according to claim 10 wherein said server system is further configured to:

receive a clearing message including the addendum file from the POS device; and transmit the clearing message with the addendum file to an issuer device, the issuer providing at least a portion of the enhanced transaction data to the cardholder in a billing statement.

15. A system according to claim 14 wherein said server system is further configured to:

transmitting the addendum file with the enhanced transaction data to the issuer device, wherein the enhanced transaction data includes at least one of data describing goods involved in the transaction, an identifying characteristic of the goods, financing terms associated with the transaction, a size of the goods, a promotion code, line item stock-keeping unit (SKU) data, and a per unit price of the goods.

16. A system according to claim 10 wherein the enhanced payment card is an enhanced co-brand payment card, the enhanced co-brand payment card is associated with a cardholder and a co-brand program, the co-brand program including an issuer, a co-brand merchant partner having one or more points of sale, and the interchange network.

17. A system according to claim 16 wherein said server system is further configured to:

store within the database a list of merchant partners associated with the co-brand program; and determine whether the transaction originated at one of the co-brand merchant partners by comparing data included within the authorization request to the list of merchant partners stored within the database.

18. A system according to claim 10 wherein said server system is further configured to:

populate a data field included within the authorization request message with the product code, the product code representing that the transaction was initiated with one of the enhanced payment cards.

19. A computer for processing a financial transaction initiated by a cardholder using an enhanced payment card, the computer is associated with a multi-party interchange network, the enhanced payment card is issued to the cardholder by an issuer, said computer comprising a processor programmed to:

store data within a database including a list of card identifiers for identifying each enhanced payment card of a plurality of enhanced payment cards;

receive an authorization request message generated at a point of sale (POS) device, the authorization request message including a card identifier and relating to the transaction initiated by the cardholder with a merchant using the enhanced payment card;

electronically identify the transaction as involving the enhanced payment card by matching the received card identifier to the list of card identifiers stored within the database;

electronically add a product code to the authorization request message identifying the transaction as an enhanced payment card transaction; and instruct the merchant to transmit an addendum file including enhanced transaction data for the enhanced payment card transaction.

20. A computer according to claim 19 wherein said processor is programmed to:

transmit the authorization request message with the product code to an issuer device;

receive an authorization response message from the issuer device, the authorization response message including an approved or declined response, and the product code; and transmit the authorization response message to the POS device, wherein the product code instructs the merchant to create the addendum file.

21. A computer according to claim 20 wherein said processor is programmed to:

receive the authorization response message from the issuer device including the approved or declined response, wherein the approved response represents that the cardholder has sufficient funds to settle the transaction and the declined response represents that the cardholder does not have sufficient funds to settle the transaction.

22. A computer according to claim 19 wherein said processor is programmed to:

receive a clearing message including the addendum file from the POS device; and transmit the clearing message with the addendum file to an issuer device, the addendum file including the enhanced transaction data for instructing the issuer to at least one of apply a promotional program to the transaction, apply a financing program to the transaction, offer a new promotional program to the cardholder, and offer a new financing program to the cardholder.

23. A computer according to claim 19 wherein said processor is programmed to:
  receive a clearing message including the addendum file from the POS device; and
  transmit the clearing message with the addendum file to an issuer device, the issuer providing at least a portion of the enhanced transaction data to the cardholder in a billing statement.

24. A computer according to claim 23 wherein said processor is programmed to:
  transmit the addendum file with the enhanced transaction data to the issuer device, wherein the enhanced transaction data includes at least one of data describing goods involved in the transaction, an identifying characteristic of the goods, financing terms associated with the transaction, a size of the goods, a promotion code, line item stock-keeping unit (SKU) data, and a per unit price of the goods.

25. A computer according to claim 19 wherein the enhanced payment card is an enhanced co-brand payment card, the enhanced co-brand payment card is associated with a cardholder and a co-brand program, the co-brand program including an issuer, a co-brand merchant partner having one or more points of sale, and the interchange network.

26. A computer according to claim 25 wherein said processor is programmed to:
  store within the database a list of merchant partners associated with the co-brand program; and
  determine whether the transaction originated at one of the co-brand merchant partners by comparing data included within the authorization request to the list of merchant partners stored within the database.

27. A computer according to claim 19 wherein said processor is programmed to:
  populate a data field included within the authorization request message with the product code, the product code representing that the transaction was initiated with one of the enhanced payment cards.

28. A computer program embodied on a computer readable medium for processing a financial transaction through an interchange network using an enhanced payment card, the enhanced payment card issued to a cardholder by an issuer, said program is executed by a computer associated with the interchange network and instructs the computer to:
  store within a database a list of card identifiers for identifying each enhanced payment card of a plurality of enhanced payment cards;
  receive an authorization request message generated at a point of sale (POS) device associated with a merchant, the authorization request message including a card identifier and relating to a transaction initiated by the cardholder with the merchant using the enhanced payment card;
  identify the transaction as involving the enhanced payment card by matching the received card identifier to the list of card identifiers stored within the database;
  add a product code to the authorization request message identifying the transaction as an enhanced payment card transaction; and
  instruct the POS device to transmit to the computer an addendum file including enhanced transaction data for the enhanced payment card transaction.

29. A computer program according to claim 28 further instructing the computer to:
  transmit the authorization request message with the product code to an issuer device;
  receive an authorization response message from the issuer device, the authorization response message including an approved or declined response, and the product code; and
  transmit the authorization response message to the POS device, wherein the product code instructs the merchant to create the addendum file.

\* \* \* \* \*